US005991334A

United States Patent [19]

Papadopoulos et al.

[11] Patent Number: 5,991,334

[45] Date of Patent: Nov. 23, 1999

[54] TECHNIQUE FOR SIMULTANEOUS COMMUNICATIONS OF ANALOG FREQUENCY-MODULATED AND DIGITALLY MODULATED SIGNALS USING POSTCANCELING SCHEME

[75] Inventors: Haralabos C. Papadopoulos, Cambridge, Mass.; Carl-Erik Wilhelm Sundberg, Chatham, N.J.

[73] Assignee: Lucent Technologies Inc., Murray Hill, N.J.

[21] Appl. No.: 08/748,043

[22] Filed: Nov. 12, 1996

[51] Int. Cl.[6] .................. H04L 25/00

[52] U.S. Cl. .................. 375/216; 375/316; 370/480

[58] Field of Search .................. 375/216, 259, 375/285, 316, 349, 350, 346, 340; 455/42, 63, 142, 143, 205, 206, 296, 303, 307; 370/343, 480, 486, 487, 493, 497, 477; 364/724.011, 724.014

[56] References Cited

U.S. PATENT DOCUMENTS

| | | | |
|---|---|---|---|
| 4,523,311 | 6/1985 | Lee et al. | 370/215 |
| 4,859,958 | 8/1989 | Myers | 329/316 |
| 5,105,435 | 4/1992 | Stilwell | 375/200 |
| 5,136,612 | 8/1992 | Bi | 370/342 |
| 5,218,619 | 6/1993 | Dent | 370/209 |
| 5,465,396 | 11/1995 | Hunsinger et al. | 455/61 |
| 5,483,686 | 1/1996 | Saka et al. | 455/182.2 |

OTHER PUBLICATIONS

"FM–2 System Description", USA Digital Radio, 1990–1995.

N. Jayant, "The AT&T DAR System Update", NAB 1994 Broadcasting Engineering Conference Proceedings, pp. 389–398.

J. Bingham, "AT&T/AMATI DAR System: An Update", NAB 1994 Broadcast Engineering Conference Proceedings, pp. 399–403.

Haykin, S., Adaptive Filter Theory. Englewood Cliffs, NJ: Prentice–Hall, p. 281, 1986.

*Primary Examiner*—Temesghen Ghebretinsae

[57] ABSTRACT

In a system for simulcasting a digitally modulated signal and an analog FM signal over the same FM frequency band, the composite signal is received and applied to a conventional FM receiver, and a digital receiver in accordance with the invention. An extended Kalman filter is employed in the digital receiver to estimate the analog FM signal based on a version of the recovered FM signal from the FM receiver, and a discrete version of the composite signal whose spectrum has been translated and is at an intermediate carrier frequency. The estimated FM signal, which is in a discrete form, is subtracted from the discrete version of the composite signal. The resulting signal, which is an estimated version of the digitally modulated signal, is demodulated to recover the digital data as transmitted.

42 Claims, 4 Drawing Sheets

TECHNIQUE FOR SIMULTANEOUS COMMUNICATIONS OF ANALOG FREQUENCY-MODULATED AND DIGITALLY MODULATED SIGNALS USING POSTCANCELING SCHEME

FIELD OF THE INVENTION

The invention relates to systems and methods for communications using analog and digitally modulated signals, and more particularly to systems and methods for simulcasting digitally modulated and analog frequency-modulated (FM) signals over an FM frequency band.

BACKGROUND OF THE INVENTION

The explosive growth of digital communications technology has resulted in an ever-increasing demand for bandwidth for communicating digital data. Because of the scarcity of available bandwidth for accommodating additional digital communications, the industry recently turned its focus to the idea of utilizing the preexisting analog FM band more efficiently to help make such an accommodation. However, it is required that any adjustment to the FM band utilization does not significantly affect the performance of the analog FM communications.

A licensing authority grants FM broadcast stations licenses to broadcast on different carrier frequencies. The separation of these carrier frequencies is 200 KHz and they are reused geographically. However, in order to account for the fairly gradual power reduction at the tails of the spectrum of an analog FM signal, closely located stations are licensed to use frequency bands separated by typically at least 800 KHz. The following provides background information on analog FM broadcast:

Analog FM Background

Let m(t) denote an analog modulating signal in FM modulation. The FM carrier $f_c$ after it is modulated by m(t) results in the following FM modulated signal $x_{FM}$:

$$x_{FM}(t)=\cos[\theta(t)],$$

where θ(t) represents the phase angle given by $$\theta(t) = 2\pi f_c t + 2\pi f_d \int_{-\infty}^{t} m(\tau)\,d\tau,$$

with the assumption that $$\max_t |m(t)| = 1,$$

where $f_d$ represents the maximum frequency deviation.

In the commercial FM setting, $f_d$ is typically 75 KHz, and m(t) is a stereo signal derived from left and right channel information signals represented by L(t) and R(t), respectively. The latter are processed by pre-emphasis filters to form $L_p(t)$ and $R_p(t)$, respectively. The frequency response ($H_p(f)$) of such filters is:

$$H_p(f) = \frac{1 + j(f/f_1)}{1 + j(f/f_2)},$$

where typically $f_1$=2.1 KHz, and $f_2$=25 KHz.

The stereo signal, m(t), is then generated according to the following expression:

$$m(t)=a_1[L_p(t)+R_p(t)]+a_2\cos(4\pi f_p t)[L_p(t)-R_p(t)]+a_3\cos(2\pi f_p t),$$

where typically $2f_p$=38 KHz, $a_1=a_2=0.4$, and $a_3=0.1$. The rightmost term, $a_3\cos(2\pi f_p t)$, in the above expression is referred to as a "Pilot Signal" with carrier frequency $f_p$. It is used by FM receivers to coherently demodulate the passband term involving the difference between the left and right signals.

A conventional FM receiver includes a device for deriving an angle signal from the received version of $x_{FM}(t)$. A mathematical derivative operation of this angle signal provides $\hat{m}(t)$, an estimate of m(t). For monophonic receivers, a lowpass filter is used to obtain an estimate of the $[L_p(t)+R_p(t)]$. Stereo receivers use the pilot signal to demodulate $[L_p(t)-R_p(t)]$, which is then linearly combined with the estimate of $[L_p(t)+R_p(t)]$ to obtain $\hat{L}_p(t)$ and $\hat{R}_p(t)$, the estimates of $L_p(t)$ and $R_p(t)$, respectively. These estimates are then processed by a deemphasis filter having the following frequency response $H_d(f)$ to obtain the estimates of the left and right signals at the transmitter:

$$H_d = \frac{1}{1 + j(f/f_1)}.$$

Prior Art Techniques

A number of techniques have been proposed to achieve the aforementioned goal of simulcasting digital data and analog FM signals using a preexisting FM band. One such technique referred to as an "In Band Adjacent Channel (IBAC)" scheme involves use of an adjacent band to transmit the digital data. FIG. 1 illustrates the relative location of the IBAC for digital broadcast in accordance with this scheme to the power spectrum of a host analog FM signal in the frequency domain. As shown in FIG. 1, the center frequencies of the IBAC and the host signal are, for example, 400 KHz apart. However, the implementation of the IBAC scheme requires a new license from the licensing authority. In addition, in a crowded market like a large populous city in the United States, the transmission power level using the IBAC scheme needs to be kept low to have minimal interference with other channels. As a result, the IBAC scheme may not afford broad geographic coverage of the digitally modulated signal. However, digital transmission is more robust than analog FM transmission, thus leading to broader coverage with digital transmission if the power levels of the two transmissions are equal. The actual coverage depends on the location of the transmitter and interference environment.

When the IBAC scheme is utilized with removal of existing analog FM transmitters, an in-band reserved channel (IBRC) scheme emerges. In accordance with the IBRC scheme, the power level of digital transmission is comparable to that of analog FM transmission, resulting in at least as broad a digital coverage as the FM coverage. By successively replacing analog FM transmitters with IBAC/IBRC transmitting facilities, a migration from a 100% analog to a 100% digital transmission of audio information over the FM band is realized.

Another prior art technique is referred to as an "In Band on Channel (IBOC)" scheme. In accordance with this scheme, digital data is transmitted in bands adjacent to, and on either side or both sides of the power spectrum of the host analog FM signal, with the transmission power level of the digitally modulated signal significantly lower than that of the FM signal. As shown in FIG. 2, the relative power of the digitally modulated signal on the IBOC to the host signal is typically 25 dB lower. Unlike the IBAC scheme, the current FM license is applicable to implementing the IBOC scheme, provided that the transmission power level of the digitally modulated signal satisfy the license requirements. Because of the requirement of the low power transmission level of the digitally modulated signal, the IBOC scheme may also be deficient in providing broad geographic coverage of same, more so than the IBAC scheme. As discussed hereinbelow, broad coverage of transmission pursuant to the IBOC scheme without an analog host is achievable using a relatively high transmission power level. As such, a migration from a 100% analog to a 100% digital transmission of audio information over the FM band is again realizable.

Other prior art techniques include one that involves use of a frequency slide scheme where the center frequency of digital modulation is continuously adjusted to follow the instantaneous frequency of a host FM waveform. According to this technique, while the spectra of the analog and digital waveforms overlap, the signals generated never occupy the same instantaneous frequency, thereby avoiding interference of the digitally modulated signal with the host analog FM signal. For details on such a technique, one may be referred to: "FM-2 System Description", U.S.A. Digital Radio, 1990–1995. However, the cost of a system implementing the technique is undesirably high as its design is complicated, and the system is required to be of extremely high-speed in order to react to the constantly changing instantaneous frequency of the host FM waveform.

Accordingly, it is desirable to have an inexpensive system whereby a digitally modulated signal can be simulcast with a host analog FM signal, with broad coverage of the digitally modulated signal.

SUMMARY OF THE INVENTION

In accordance with the invention, a composite signal including a host analog FM signal and a digitally modulated signal is transmitted over an allocated FM frequency band, where the power spectrum of the digitally modulated signal overlaps at least part of that of the analog FM signal. After the composite signal is received, an extended Kalman filter is employed to generate a representative version of the analog FM signal in response to at least a version of the composite signal. The information represented by the digitally modulated signal is recovered as a difference between the version of the composite signal and the representative version of the analog FM signal.

DETAILED DESCRIPTION

Figure 3:
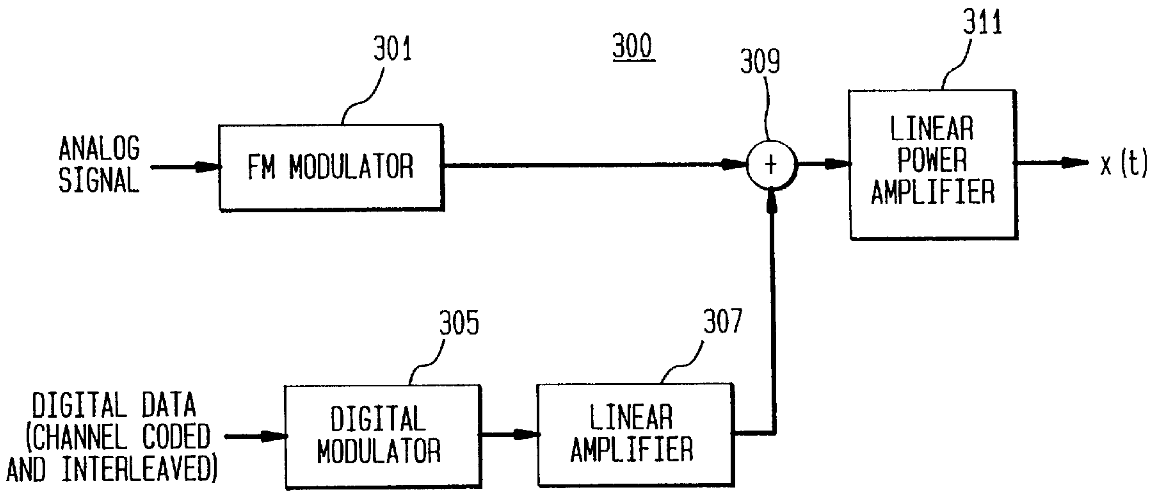
FIG. 3 is a block diagram of a transmitter for simultaneously communicating analog FM and digitally modulated signals in accordance with the invention.

FIG. 3 illustrates transmitter 300 for simulcasting digitally modulated signals and analog FM signals in accordance with the invention. FM modulator 301, which may reside in a FM radio station, in a standard way generates a stereo FM signal in response to an analog input signal denoted m(t). The FM signal is to be transmitted over a frequency band, which in this instance is 200 KHz wide, allocated to the FM broadcast.

In accordance with the invention, the same FM band is used for transmission of digital data. The digital data to be transmitted is interleaved and channel coded in a conventional manner to become more immune to channel noise. In that process, a sequence of data symbols are used to represent the digital data. In response to such data symbols, digital modulator 305 generates a digitally modulated signal pursuant to, for example, a conventional orthogonal frequency division multiplexing (OFDM) multicarrier scheme, single carrier scheme, or alternatively spread spectrum orthogonal signaling scheme.

One of the objectives of the invention is to allow an FM receiver to process the host analog FM signal in a conventional manner and provide virtually undeteriorated FM quality, even though the analog FM signal may share the same frequency band with the digitally modulated signal. To that end, the amplitude of the digitally modulated signal is scaled by linear amplifier 307 such that the relative power of the digitally modulated signal to the host analog FM signal is as high as possible, subject to the maximum allowable co-channel interference by the digitally modulated signal to the analog FM signal at the FM receiver, which is to be described.

The scaled digitally modulated signal is applied to adder 309 where it is added to the analog FM signal generated by FM modulator 301. The output of adder 309 is applied to linear power amplifier 311 of conventional design. The latter transmits an amplified version of the composite FM and digitally modulated signal, denoted x(t), over the allocated FM frequency band. Thus, $$x(t)=x_{FM}(t)+d(t),$$

where d(t) represents the transmitted digitally modulated signal.

Figure 1:
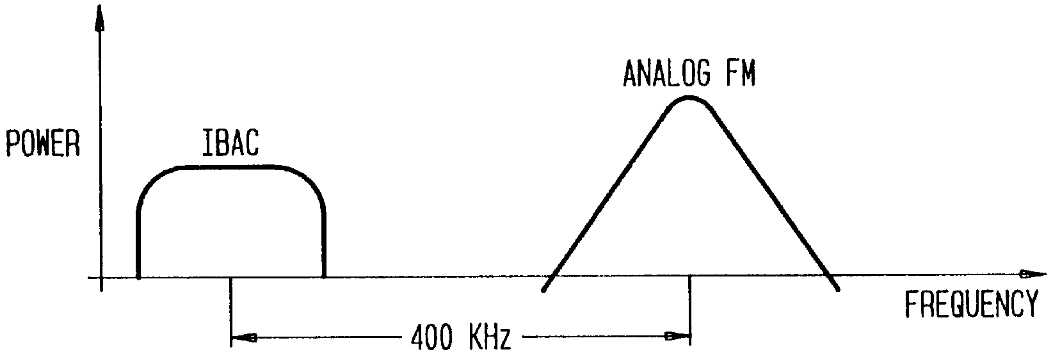
FIG. 1 (PRIOR ART)
FIG. 1 illustrates the relative power and location of an in band adjacent channel (IBAC) scheme to an analog FM carrier in the frequency domain in prior art.
Figure 2:
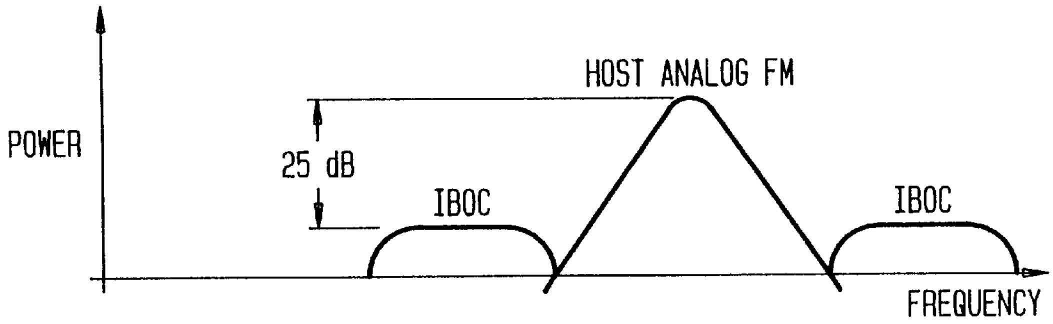
FIG. 2 (PRIOR ART)
FIG. 2 illustrates the relative power and locations of in band on channel (IBOC) scheme to a host analog FM carrier in the frequency domain in prior art.
Figure 4:
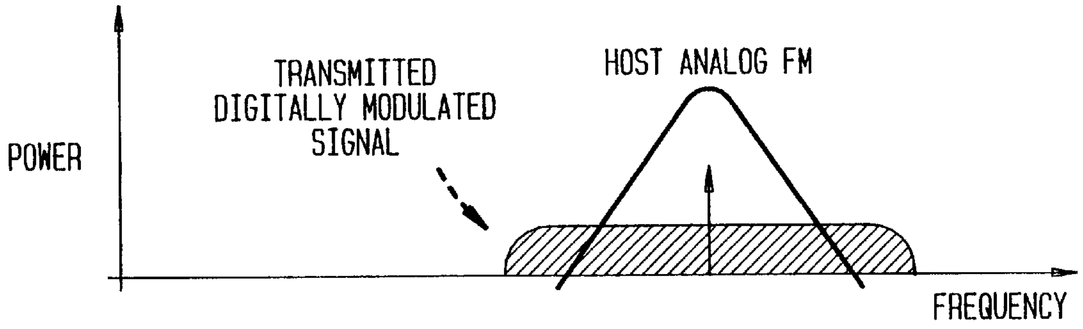
FIG. 4 illustrates a power spectrum of the composite signal communicated by the transmitter of FIG. 3.

FIG. 4 shows a power spectrum of x(t) illustratively populating an FM broadcast band at 88–108 MHz, where a significant portion of the spectrum of d(t) overlaps that of $x_{FM}(t)$. Thus, in accordance with the invention, the digital data is transmitted not only outside the host FM signal spectrum as in the prior art, but also within same. As shown in FIG. 4, the power level of the transmitted digitally modulated signal is relatively low with respect to that of the transmitted FM signal to minimize the co-channel interference to the analog FM signal mentioned before. Coverage of a digitally modulated signal transmitted at such a low power level is normally limited, given a high data rate. However, the inventive postcanceling scheme improves the signal coverage. In accordance with this scheme, the receiver to be described relies on robust cancellation of the recovered analog FM signal from the received signal to obtain the underlying weak digitally modulated signal. Since the inventive scheme calls for cancellation of the analog FM signal at the digital receiver to be described, i.e., after the transmission of the composite signal, it is henceforth referred to as a "Postcanceling Scheme".

Specifically, since the analog FM signal dominates the composite signal transmission, taking advantage of the well-known FM capture effect, one can achieve high quality FM demodulation to recover the baseband analog signal using a conventional FM receiver. In accordance with the invention, the analog FM signal component of the received composite signal is regenerated at the digital receiver using an extended Kalman filter to be described. The regenerated analog FM signal is then subtracted from the received signal, thereby recovering the weak digitally modulated signal.

Figure 5:
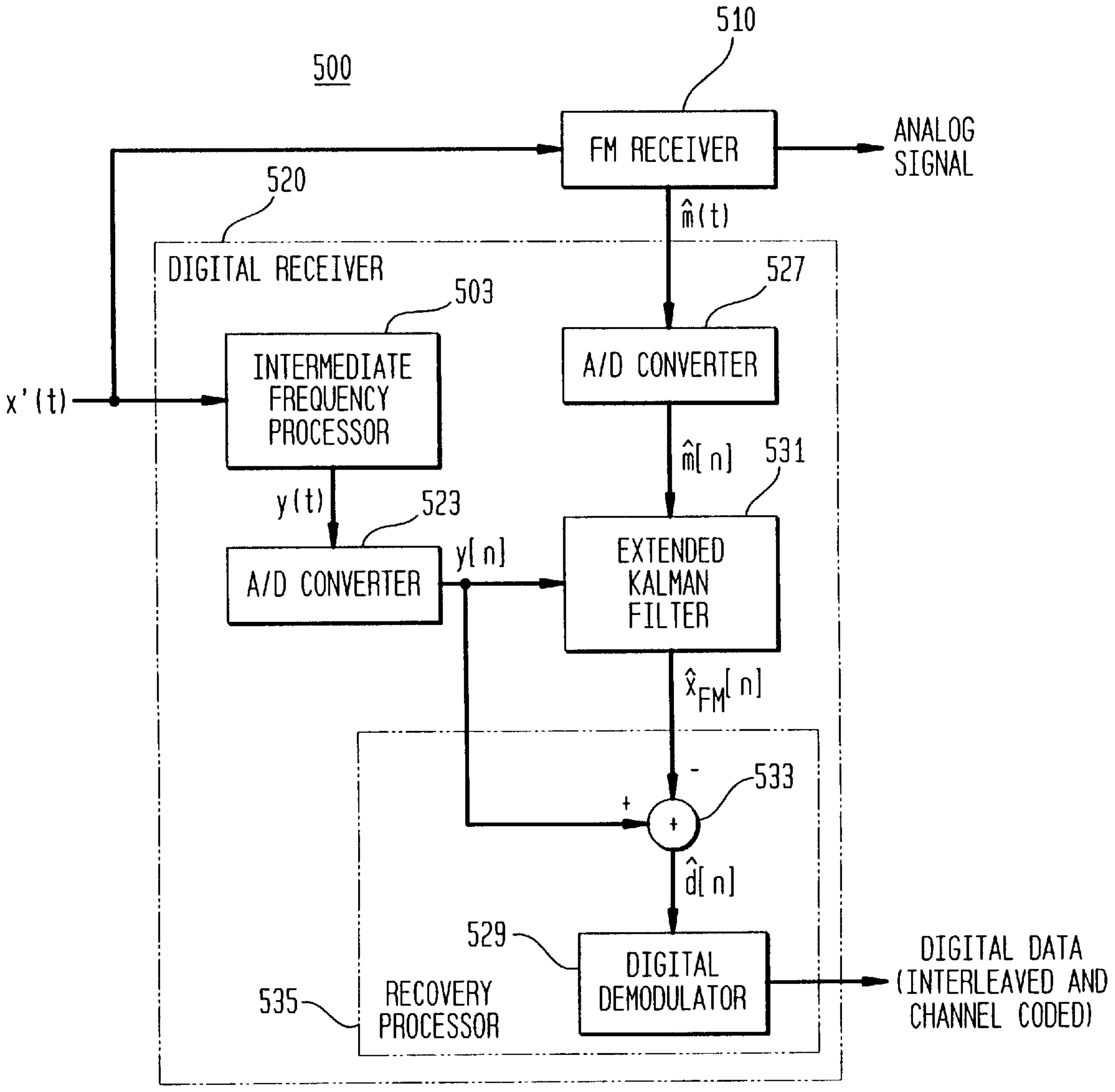
FIG. 5 is a block diagram of a receiver for recovering the transmitted analog signal and digital data from the composite signal, in accordance with the invention.

Referring now to FIG. 5 which illustrates receiver 500 embodying the principles of the invention for receiving from the FM band the composite signal, x'(t), corresponding to the transmitted signal x(t). In this particular illustrative embodiment, $$x'(t)=x(t)+w(t),$$

where w(t) represents additive noise from the FM channel.

As shown in FIG. 5, receiver 500 includes FM receiver 510 and digital receiver 520. In response to x'(t), FM receiver 510 of conventional design recovers the original analog signal using its well-known capture capability mentioned before. The received composite signal x'(t) is also applied to digital receiver 520, wherein intermediate frequency processor 503 in a standard way translates the spectrum of x'(t) from the FM broadcast band at 88–108 MHz to an intermediate frequency band.

The output of processor 503, denoted y(t), is fed to analog-to-digital (A/D) converter 523 of conventional design. Converter 523 provides a uniformly-sampled version of y(t), denoted y[n], to extended Kalman filter 531 in accordance with the invention, where t=nT; n is an integer and T represents the sampling period of the converter. In a well-known manner, FM receiver 510 generates an estimate of the analog signal, denoted $\hat{m}(t)$, which is the pre-deempasized version of the recovered analog signal. This estimate is fed to analog-to-digital converter 527 which then provides a scaled, uniformly-sampled version of $\hat{m}(t)$, denoted $\hat{m}[n]$. The discrete signal $\hat{m}[n]$ is also furnished to filter 531 in accordance with the invention.

Based on the above inputs y[n] and $\hat{m}[n]$, extended Kalman filter 531 estimates $x_{FM}[n]$ representing a uniformly-sampled version of the analog FM signal. The resulting estimate is denoted $\hat{x}_{FM}[n]$. The manner in which $\hat{x}_{FM}[n]$ is computed is fully described hereinbelow. In any event, $\hat{x}_{FM}[n]$ is applied to subtracter 533 in recovery processor 535 where it is subtracted from y[n] to yield an estimated uniformly-sampled version of the digitally modulated signal, denoted $\hat{d}[n]$. Digital demodulator 529 performs the inverse function to modulator 305 to recover, from $\hat{d}[n]$, the transmitted digital data, albeit channel-coded and interleaved.

The manner in which $\hat{x}_{FM}[n]$ is computed by extended Kalman filter 531 will now be described. Let θ[n] denote a uniformly-sampled version of the analog signal phase θ(t) defined above. Thus, $$x_{FM}[n]=\cos(\theta[n]), \qquad (1)$$

where $$\theta[n+1]=\omega_0+\theta[n]+m[n],$$

where $\omega_0$ is the equivalent discrete time intermediate subcarrier angle frequency, and m[n] represents a scaled, uniformly sampled version of m(t). A state-space model for estimating θ[n] for the extended Kalman filter analysis by filter 531 is demonstrated as follows:

$$\theta[n+1]=\omega_0+\theta[n]+\hat{m}[n]+\xi[n], \qquad (2)$$

and $$y[n]=\cos(\theta[n])+v[n], \qquad (3)$$

where $$\xi[n]=m[n]-\hat{m}[n],$$

and $$v[n]=d[n]+w[n].$$

The sequence ξ[n] here is assumed to be white noise of certain variance. Even though in actuality ξ[n] is most likely not white (and the variance selection may not be exact), the assumption helps lay a framework for a standard extended Kalman filter analysis by filter 531. Specifically, θ[n] represents a state variable in such an analysis; $\hat{m}[n]$ represents a deterministic driving input; ξ[n] represents state noise; y[n] represents a required measurement; and v[n] represents measurement noise.

The extended Kalman filter analysis by filter 531 pursuant to the above state-space model includes performing, in a well-known manner, an initialization step, a prediction step and a measurement update step. Each step is illustratively described as follows:

Initialization Step $$\hat{\theta}[0|-1]=0,$$

and $$P[0|-1]=\pi^2/3,$$

where $\hat{\theta}[0|-1]$ represents an estimate of θ[n] with n=0, given the n=−1 sample which in this instance is fictitious. For a Kalman filter corresponding to a linear state space model, P[n|k] corresponds to the variance of the estimate $\hat{\theta}[n|k]$, i.e, the estimate of θ[n] given all observations up to the n=k sample. See, e.g., B. Anderson and J. Moore, "Optimal Filtering," Prentice Hall, New York, 1979. In an extended Kalman filter setting, P[n|k] is an intermediate variable in the computation of the estimate of θ[n].

Prediction Step $$\hat{\theta}[n+1|n]=\hat{\theta}[n|n]+\omega_0+\hat{m}[n],$$

and $$P(n+1|n]=P[n|n]+Q,$$

where Q represents the variance of ξ[n].

Measurement Update Step $$\hat{\theta}[n|n]=\hat{\theta}[n|n-1]+K[n][y[n]-\cos(\hat{\theta}[n|n-1])],$$

$$K[n]=-\frac{P[n|n-1]\sin(\hat{\theta}[n|n-1])}{P[n|n-1]\sin^2(\hat{\theta}[n|n-1])+R},$$

and $$P[n|n]=-\frac{P[n|n-1]R}{P[n|n-1]\sin^2(\hat{\theta}[n|n-1])+R},$$

where R represents the variance of v[n].

By performing the above steps, filter 531 obtains an estimate of θ[n], for each n=0, 1, 2, . . . . Filter 531 then computes the estimated $x_{FM}(n)$ pursuant to expression (1) above. Were the above model linear, filter 531 would minimize the error in estimating θ[n], i.e., the difference between $\hat{\theta}[n]$ and θ[n].

However, one may be more interested in directly obtaining an estimate of $x_{FM}(n)$ through the extended Kalman filter analysis, instead. Thus, in an alternative embodiment, a two-dimensional state-space model for estimating $x_{FM}[n]$ is used by filter 531 in performing the extended Kalman filter analysis. Such a model is demonstrated as follows:

$$\theta[n+1]=\theta[n]+\omega_0\hat{m}[n]+\xi[n],$$

$$x_{FM}[n+1]=\cos\ (\theta[n]+\omega_0+\hat{m}[n]+\xi[n]),$$

and $$y[n]=x_{FM}[n]+v[n].$$

In a second alternative embodiment, filter 531 adopts a well-known fixed-lag smoothing approach to perform the extended Kalman filter analysis to provide an estimate of θ[n]. Specifically, filter 531 in this embodiment provides a fixed-lag smoothed estimate thereof, which is denoted $\hat{\theta}[n-N\mid n]$, where N is a selected time lag size in accordance with such an approach. $\hat{\theta}[n-N\mid n]$ represents the value of an estimated phase N sampling intervals (T) ago, given the current estimated phase value. In other words, the fixed-lag current phase estimate takes into account all samples from the past and up to N samples in the future to produce the current estimate. As such, the smoothed phase estimate is more accurate than the phase estimate pursuant to the previous model defined by expressions (2) and (3).

The state-space model based on the fixed-lag smoothing approach will now be described. A matrix z[n] is defined as follows:

$$z[n]\triangleq[\theta[n]\theta[n-1]\ .\ .\ .\ \theta[n-N]]^T,$$

where the superscript "T" denotes a standard matrix transposition operation. With z[n] defined, the state-space model in question can be described by the following expressions:

$$z[n+1]=Az[n]+B(\omega_0+m[n])+G\xi[n],$$

and $$y[n]=\cos\ (\theta[n])+v[n],$$

where $$A=\begin{bmatrix}1 & 0 & 0 & \cdots & 0\\ 1 & 0 & 0 & \cdots & 0\\ 0 & 1 & 0 & \cdots & 0\\ \vdots & \ddots & \ddots & \ddots & \vdots\\ 0 & \cdots & 0 & 1 & 0\end{bmatrix},\text{ and}$$

$$B=G=\begin{bmatrix}1\\ 0\\ \vdots\\ 0\\ 0\end{bmatrix}.$$

With the above state-space model, filter 531 in a well-known manner performs the corresponding initialization step, prediction step and measurement update step. Specifically, a vector update estimate $\hat{z}[n\mid n]$ in the measurement update step is expressed as follows:

$$\hat{z}[n\mid n]=[\hat{\theta}[n\mid n]\ \hat{\theta}[n-1\mid n]\ .\ .\ .\ \hat{\theta}[n-N\mid n]]^T,$$

and contains the smoothed estimate $\hat{\theta}[n-N\mid n]$ as required.

The foregoing merely illustrates the principles of the invention. It will thus be appreciated that those skilled in the art will be able to devise numerous other schemes which embody the principles of the invention and are thus within its spirit and scope.

Figure 6:
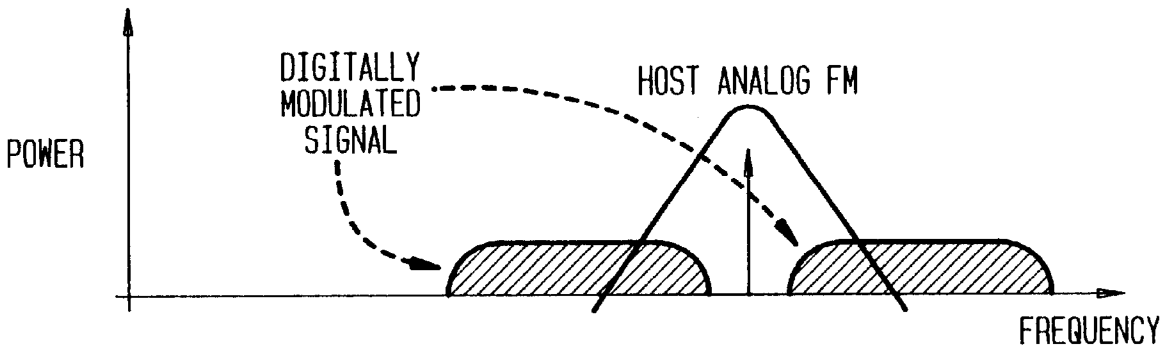
FIG. 6 illustrates a second power spectrum of the composite signal communicated by the transmitter of FIG. 3.
Figure 7:
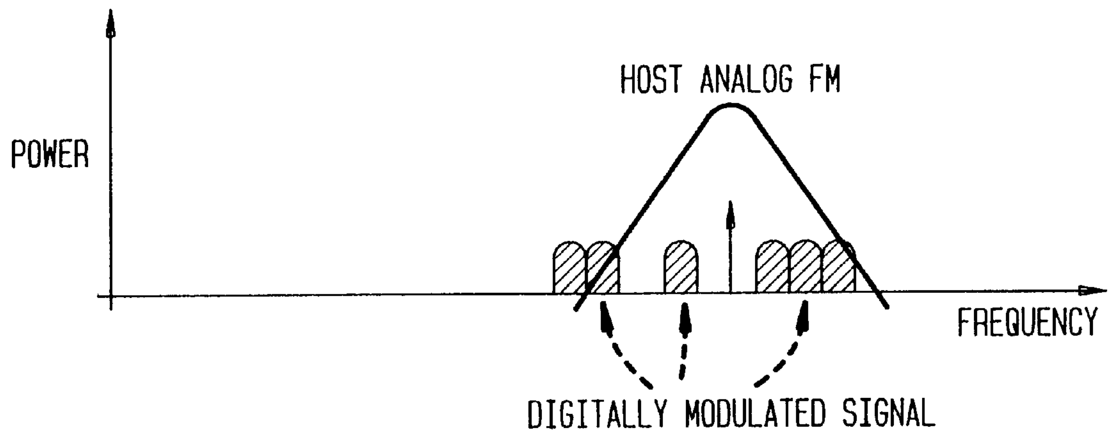
FIG. 7 illustrates a third power spectrum of the composite signal communicated by the transmitter of FIG. 3.

For example, as shown in FIG. 4, the power spectrum of the digitally modulated signal is wider than the analog FM band, which is typically 200 KHz wide. It may be made narrower than the FM band if so desired. The power spectrum of the digitally modulated signal may also be centered around a carrier on each of left and right sides of the analog FM carrier, overlapping a part of the FM power spectrum on each side, as shown in FIG. 6. Alternatively, the power spectrum of the digitally modulated signal may be selected subdivisions of that of FIG. 4, as shown in FIG. 7.

In addition, the postcanceling technique described herein may be used in combination with other techniques such as the precanceling technique disclosed in the co-pending, commonly assigned U.S. patent application Ser. No. 08/704,470, filed on Aug. 22, 1996, entitled "Technique for Simultaneous Communications of Analog Frequency-modulated and Digitally Modulated Signals using Precanceling Scheme", or a technique utilizing a control channel if the analog FM signals are dynamic.

Finally, the postcanceling technique described herein can be repeatedly applied to further cancel the FM component from the estimated, digitally modulated signal at the output of subtracter 533, thereby improving the accuracy of same.

We claim:

1. A receiver comprising:

a receive element for receiving over a frequency band a composite signal including an analog signal and a second signal;

a filter for computing a representative version of said analog signal based on at least a version of said composite signal and a third signal; and a processor responsive to the version of said composite signal and the representative version of said analog signal for recovering digital information represented by said second signal.

2. The receiver of claim 1 wherein said analog signal includes an analog frequency-modulated (FM) signal, and said second signal includes a digitally modulated signal.

3. The receiver of claim 2 wherein said frequency band is an FM band.

4. The receiver of claim 1 further comprising a second processor responsive to said composite signal for recovering said analog signal.

5. The receiver of claim 1 further comprising a subtracter for computing a difference between the value of the version of said composite signal and the value of the representative version of said analog signal.

6. The receiver of claim 1 wherein said third signal includes a second version of said analog signal.

7. The receiver of claim 6 wherein said filter performs an extended Kalman filter analysis based on the second version of said analog signal and the version of said composite signal.

8. The receiver of claim 7 wherein said extended Kalman filter analysis includes estimating a phase of said analog signal.

9. The receiver of claim 8 wherein said extended Kalman filter analysis is performed pursuant to a fixed-lag smoothing approach.

10. The receiver of claim 7 wherein said analog signal includes an analog FM signal, and said extended Kalman filter analysis includes estimating said analog FM signal.

11. A communications system comprising:

a transmit element for transmitting over a frequency band a composite signal including a first signal representing analog information and a second signal representing digital information;

a processor responsive to said composite signal for recovering said analog information;

a filter responsive to at least a version of said composite signal and a third signal for generating a representative version of said first signal; and a second processor responsive to the version of said composite signal and the representative version of said first signal for recovering said digital information.

12. The system of claim 11 wherein said first signal includes an analog FM signal, and said second signal includes a digitally modulated signal.

13. The system of claim 11 wherein said frequency band is an FM band.

14. The system of claim 11 wherein a power spectrum of said second signal overlaps at least a portion of a power spectrum of said first signal.

15. The system of claim 14 wherein the power spectrum of said second signal overlaps each of left and right parts of the power spectrum of said first signal.

16. The system of claim 11 wherein said third signal includes a second version of said first signal.

17. The system of claim 16 wherein said filter performs an extended Kalman filter analysis based on the second version of said first signal and the version of said composite signal.

18. The system of claim 17 wherein said first signal includes an analog signal, and said extended Kalman filter analysis includes estimating a phase of said analog signal.

19. The system of claim 18 wherein said extended Kalman filter analysis is performed pursuant to a fixed-lag smoothing approach.

20. The system of claim 17 wherein said first signal includes an analog FM signal, and said extended Kalman filter analysis includes estimating said analog FM signal.

21. The system of claim 11 further comprising a subtracter for computing a difference between the value of the version of said composite signal and the value of the representative version of said first signal.

22. A method for use in a receiver comprising:

receiving over a frequency band a composite signal including an analog signal, and a second signal representing digital information;

computing a representative version of said analog signal based on at least a version of said composite signal and a third signal; and recovering said digital information in response to the version of said composite signal and the representative version of said analog signal.

23. The method of claim 22 wherein said analog signal includes an analog FM signal, and said second signal includes a digitally modulated signal.

24. The method of claim 23 wherein said frequency band includes an FM band.

25. The method of claim 22 further comprising recovering said analog signal in response to said composite signal.

26. The method of claim 22 further comprising computing a difference between the value of the version of said composite signal and the value of the representative version of said analog signal.

27. The method of claim 22 wherein the third signal includes a second version of said analog signal.

28. The method of claim 27 further comprising performing an extended Kalman filter analysis based on the second version of said analog signal and the version of said composite signal.

29. The method of claim 28 wherein said extended Kalman filter analysis includes estimating a phase of said analog signal.

30. The method of claim 29 wherein said extended Kalman filter analysis is performed pursuant to a fixed-lag smoothing approach.

31. The method of claim 28 wherein said analog signal includes an analog FM signal, and said extended Kalman filter analysis includes estimating said analog FM signal.

32. A method for use in a communications system comprising:

transmitting over a frequency band a composite signal including a first signal representing analog information and a second signal representing digital information;

recovering said analog information in response to said composite signal;

computing a representative version of said first signal based on at least a version of said composite signal and a third signal; and deriving said digital information from the version of said composite signal and the representative version of said first signal.

33. The method of claim 32 wherein said first signal includes an analog FM signal, and said second signal includes a digitally modulated signal.

34. The method of claim 32 wherein said frequency band is an FM band.

35. The method of claim 32 wherein a power spectrum of said second signal overlaps at least a portion of a power spectrum of said first signal.

36. The method of claim 35 wherein the power spectrum of said second signal overlaps each of left and right parts of the power spectrum of said first signal.

37. The method of claim 32 wherein said third signal includes a second version of said first signal.

38. The method of claim 37 further comprising performing an extended Kalman filter analysis based on the second version of said first signal and the version of said composite signal.

39. The method of claim 38 wherein said first signal includes an analog signal, and said extended Kalman filter analysis includes estimating a phase of said analog signal.

40. The method of claim 39 wherein said extended Kalman filter analysis is performed pursuant to a fixed-lag smoothing approach.

41. The method of claim 38 wherein said first signal includes an analog FM signal, and said extended Kalman filter analysis includes estimating said analog FM signal.

42. The method of claim 32 further comprising computing a difference between the value of the version of said composite signal and the value of the representative version of said first signal.

* * * * *